UNITED STATES PATENT OFFICE.

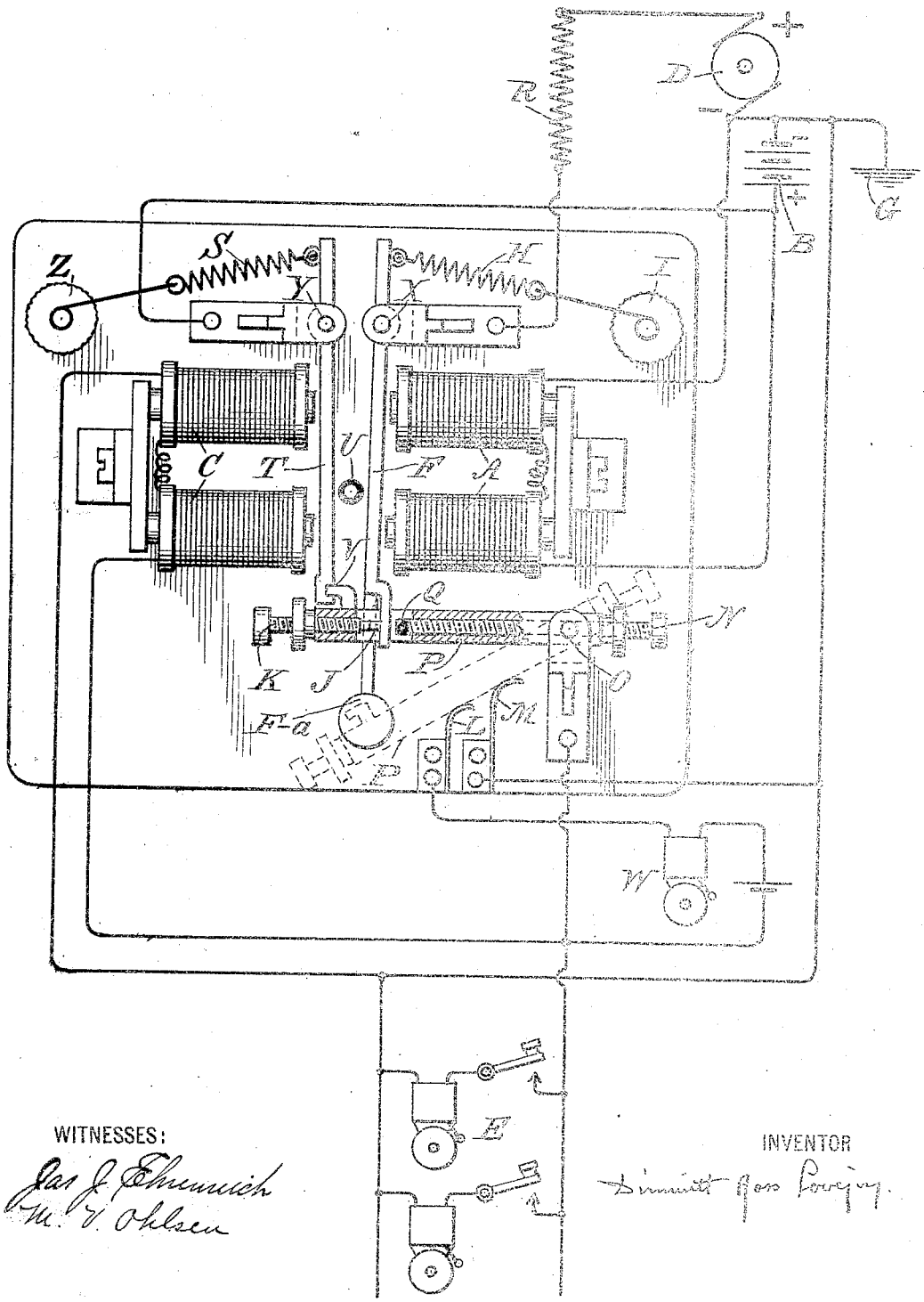

DIMMITT ROSS LOVEJOY, OF IRVINGTON, NEW YORK.

CONSTANT-POTENTIAL ELECTRICAL SYSTEM.

1,111,263.

Specification of Letters Patent.

Patented Sept. 22, 1914.

Application filed July 19, 1909. Serial No. 508,504.

*To all whom it may concern:*

Be it known that I, DIMMITT ROSS LOVEJOY, a citizen of the United States, residing at Irvington, in the county of Westchester and State of New York, have invented certain new and useful Improvements in Constant-Potential Electrical Systems, of which the following is a specification.

My invention relates to constant potential electrical systems of low voltage; and the objects of my invention are, to provide a means whereby storage batteries may be economically used as a source of current for telephones, bells, signaling systems, etc., to provide a reliable and simple means for keeping such batteries charged from the electric lighting circuits of the house without unnecessary use of current and without attention, and further to provide that the higher voltage of the lighting system can in no case be impressed upon the low voltage apparatus and wiring, either on open or closed circuit condition of the latter.

I am aware that secondary batteries have been used for ringing bells, etc., and that these batteries have been charged from the lighting circuits with an interposed resistance to cut down the voltage; but this method is open to a number of objections. It involves an unnecessary and constant waste of current, an attendant is required to cut in the charging current when the battery is partly exhausted and to cut off the current when the battery comes up to full charge or, if the charging current is left on all of the time, the current is wasted and the batteries injured by prolonged overcharge; moreover, when the current is thus left on, or even when it is on only part of the time, if a high resistance or a complete open circuit should occur at the battery for any reason, as by corrosion of the connections, loss of electrolyte by evaporation and electrolysis or by accidental breakage of a battery jar, such condition being abnormal the higher voltage of the lighting circuit will be impressed upon the bell wiring, with a consequent dangerous fire hazard on account of the usual poor quality of such wiring.

My invention provides means whereby the battery is automatically kept fully charged without danger of overcharging, under what I will call the normal variations in voltage of said battery and at the same time makes it impossible for any accident, or what I will call an abnormal condition to cause the higher voltage to be impressed upon the low voltage circuits.

Referring to the drawing, which represents a complete automatic device for the accomplishing of the above enumerated ends, A and C represent electromagnets having many turns of fine wire. A and C are normally connected in parallel with each other and across the terminals of the secondary battery B. A relatively high voltage source of direct current is indicated at D, such as an electric lighting circuit of say 120 volts.

E represents a system of low voltage wiring and apparatus, such as electric bells, etc. W represents an auxiliary alarm bell and battery. The magnets A act upon an armature F in opposition to an adjustable spring H, whose tension may be regulated by means of the knurled screw I. The armature F is provided with a contact point J, preferably of platinum and adapted to make connection with the end of contact screw K, also preferably tipped with platinum, when drawn back by spring H in opposition to the pull of magnets A. Contact screw K is mounted at the end of a bar P, said bar P being pivoted at O and adapted to swing downward to the position shown in the dotted outline in the drawing. Bar P is normally prevented from falling by a latch V at the end of armature T, said latch being released and leaving the bar P free to drop when the armature T is pulled to the left by its magnets C. When bar P drops, the opening of latch V disconnects bar P from the + side of battery B, the point of screw K is moved out of the path of contact J, and the bar P makes contact with the spring L, thus sounding the alarm W, and with the spring M, which thus short circuits the low tension system E. The armature F and the cores of the magnets A are preferably made of a rather hard grade of iron so as to have considerable magnetic hysteresis. This is necessary to secure a positive opening and closing of the contacts J, K, and this effect of hysteresis is assisted by the change in length of the air gaps when armature F approaches or recedes from the poles of magnets A. The magnets A together with their armature F are so proportioned as to act relatively slowly as compared with the magnets C and their armature T. An adjustable stop screw N having an insulated tip Q is provided to limit the approach of armature F to the magnet poles, and consequently to adjust the minimum length of the above mentioned air gaps, and their maximum length is adjusted by means of the contact screw K. A ground connection is shown at G, it being assumed that the negative side of the lighting circuit is grounded. The other connections are as shown in the drawing.

The operation of the device is as follows: When the apparatus is set up and the connections made as shown, the battery B being uncharged, the magnets A and C are not energized, and their respective armatures are both pulled back by the springs as shown in the drawing. Current then flows from source D, through resistance R, (said resistance being of a value depending upon the size and current demand of the system E—in most cases R will be about 600 ohms where D is of 120 volts) thence through pivot X and armature F to contact J, K, thence through latch V to armature T and to the + side of battery B, and from the — side of battery back to — side of source D. The tension of spring H is then adjusted so that when battery B is up to normal voltage, say about 2.4 volts per cell, the magnets A will just be able to overcome spring H, pull the armature over, open contacts J, K, and interrupt the charging current. When armature F starts to move, it will go all the way until it strikes the stop Q; on account of the shortening of the air gaps by the approach of the said armature to the magnet poles, and, on account of hysteresis and this shortening, it will be held even after the voltage of the battery has fallen through use, since the magnetism of the hard iron will not decrease as fast as the magnetizing current in the coils and consequently the charging current will be kept off until the voltage of the battery has fallen considerably. When this has taken place however, the iron will have demagnetized sufficiently for the spring H to overcome the magnetic pull, draw the armature back, cut in the contacts J, K, and again start the charging current. Now, on account of hysteresis and the lengthened air gaps, the magnetism of the cores will build up more slowly than the voltage of the battery and the magnetizing current dependent thereon, and some time will elapse before the magnet is again able to overcome the spring H and again open the contacts J, K. The adjustment of the screw K and of the spring H will determine the voltage at which the armature is drawn over toward the magnets, and the adjustment of screw N will determine how far it is drawn and how long it will be held—this in conjunction with the other factors involved. The coils A, being permanently connected with the battery, the magnetism of their iron magnetic circuit will follow the voltage of said battery but, as before pointed out, the magnetism will lag behind the voltage changes and consequently the armature F will be in stable condition when the contacts J, K are either open or closed, and so vibration or chattering of the armature will not occur and the battery will be automatically connected and disconnected to and from the charging source so as normally to keep its charge up to substantially full normal voltage.

The magnets C are wound with finer wire than those of A, or the air gaps intervening between said magnets and armature T are longer, or both, so that when the battery is up to full voltage, the said magnets C are still unable to pull the armature T and unlatch V, and consequently this part of the device does not operate under what I have called normal conditions.

The battery being connected across the terminals of the working circuit E, the voltage impressed thereon cannot exceed that of the battery so long as the battery is in order. If however, the battery should become open circuited in any way as hereinbefore pointed out, then, when the contacts J, K are closed, the full voltage of D would be impressed upon the system E and upon both magnets A and C. To prevent anything more than a moderate rise of voltage on E, the adjustment of magnets C is such that the armature T will be attracted whenever a voltage of say 50% or 100% above normal of the battery is reached, this voltage being still much lower than that of the source D, and not yet reaching a value dangerous to E. When this happens, the latch V is opened, the bar P is released and drops down into the position shown by the dotted outline in the drawing and closes the auxiliary alarm contact L and at the same time moves screw K out of range of contact J and so entirely cuts out the + side of the high potential D. Furthermore, bar P also closes contact M and short circuits the working circuit E, thus insuring beyond any doubt that there can be no rise of voltage upon said system E. The armatures T and F will both fall back against the common stop U as both magnet windings will be without current. The closing of contact L starts the alarm W and at once calls attention to the fact that there is something wrong and, when this is attended to, the device is re-set by lifting bar P back by hand until it again locks in its normal position. The armature F is preferably provided with a weight $F_a$ to increase its moment of inertia so that when an abnormal rise of voltage takes place, the armature T will move quicker than F and open the latch V before arcing can occur at the contacts J, K. There will of course occur a momentary moderate rise of voltage on E when the above action takes place but, as before pointed out, the amount of this abnormal rise of voltage is limited by the adjustment of magnets C and armature F so as to operate the cut out device before the rise of voltage on E can reach a value sufficiently high to be dangerous thereto, and after the cut out has operated there will be no voltage whatever impressed on E. The armature T is purposely made light and quick acting so as to respond instantly when the voltage starts to rise.

I claim—

1. A low potential system comprising a storage battery, a low tension working circuit, a relatively high potential source of charging current for said battery, resistance for controlling said charging current, and means for automatically short circuiting said working circuit when the voltage across its terminals rises abnormally.

2. A low potential system comprising a working circuit, a storage battery, a relatively high potential source of charging current, resistance for controlling said charging current, and means for automatically disconnecting said source and said working circuit from said battery and for short circuiting said working circuit when the voltage across its terminals rises abnormally.

3. A low potential system comprising a working circuit, a storage battery, a relatively high potential source of charging current, resistance for controlling said charging current, and means for automatically disconnecting said source and said working circuit from said battery and for short circuiting said working circuit and for sounding an alarm when the voltage across the terminals of said battery and working circuit rises abnormally.

4. A low potential system comprising a storage battery, a relatively high potential source of charging current, resistance for controlling said charging current, means for automatically connecting and disconnecting said source to and from said battery under normal variations in voltage of said battery, said means acting relatively slowly, and additional means for automatically disconnecting said source from said battery when the voltage across its terminals rises to a value above the fully charged voltage of said battery, said additional means acting relatively quickly by reason of any abnormal condition.

5. A low potential system comprising a working circuit, a storage battery, a relatively high potential source of charging current, resistance for controlling said charging current, means for automatically connecting and disconnecting said source to and from said battery under normal variations in voltage of said battery, and means for automatically short circuiting said working circuit when the voltage across its terminals rises abnormally.

6. A low potential system comprising a working circuit, a storage battery, a relatively high potential source of charging current, resistance for controlling said charging current, means for automatically connecting and disconnecting said source to and from said battery under normal variations in voltage of said battery, and means for automatically disconnecting said source and said working circuit from said battery and for short circuiting said working circuit when the voltage across their terminals rises abnormally.

7. A low potential system comprising a working circuit, a storage battery, a relatively high potential source of charging current, resistance for controlling said charging current, means for automatically connecting and disconnecting said source to and from said battery under normal variations in voltage of said battery, and means for automatically disconnecting said source and said working circuit from said battery and for short circuiting said working circuit and for sounding an alarm when the voltage across the terminals of said working circuit rises abnormally.

8. In a low tension system, the combination with a low tension working circuit and a low tension storage battery shunted across said circuit, of a relatively high tension source of charging current for said battery, series resistance for reducing the voltage of said high tension source by ohmic drop, and automatic means for preventing said high voltage from being impressed upon said working circuit in case of an abnormally high resistance in said shunted battery circuit, said automatic means being adapted to operate on a relatively small rise of voltage above the full charge voltage of said battery, and said automatic means acting relatively quickly.

9. A low potential system comprising a storage battery, a relatively high tension source of charging current for said battery, resistance for limiting said charging current, a working circuit connected across the terminals of said battery, an electromagnet and an armature therefor having jointly a slower rate of time response and connected in parallel with said working circuit and having an armature adapted to control the opening and closing of the circuit leading from said source to said battery, and an additional electromagnet and armature having jointly a quicker rate of time response and also connected in parallel with said working circuit and adapted to respond to a higher voltage than the magnet and armature having the slower time rate and, in so responding, to permanently open the respective circuits connecting said battery to said source and said battery to said working circuit, for the purpose of protecting said working circuit against an abnormal rise of voltage.

DIMMITT ROSS LOVEJOY.

Witnesses:
Jas. J. Ehrenreich,
M. V. Ohlsen.